2,872,480
OZONE PRODUCTION OF DIPHENIC ACID

Ruth M. Pentz, Bordentown, N. J., assignor to The Welsbach Corporation, Philadelphia, Pa., a corporation of Delaware No Drawing. Application July 18, 1955
Serial No. 522,875

5 Claims. (Cl. 260—523)

This invention relates to processes for the production of diphenic acid and more particularly to such processes in which diphenic acid is obtained from phenanthrene. Even more particularly this invention relates to processes for producing diphenic acid from phenanthrene in which phenanthrene is reacted with ozone.

Heretofore diphenic acid has been produced by direct oxidation of phenanthrene to obtain phenanthraquinone and diphenic acid has then been obtained from the phenanthraquinone. In another known procedure phenanthrene has been oxidized directly to diphenic acid utilizing peracetic acid but this reaction is quite costly and is commercially and economically unacceptable for that reason.

Attempts have heretofore been made to ozonize phenanthrene but with no isolatable results. Phenanthraquinone has been ozonized and diphenic acid has been isolated.

The present invention, for the first time, and most unexpectedly, provides processes whereby phenanthrene is directly ozonized to diphenic acid as will be more fully described hereinafter.

It is therefore an object of the present invention to provide novel processes for directly ozonizing phenanthrene to produce diphenic acid.

The processes of the present invention are capable of various modifications and procedural variations. The phenanthrene may be dissolved in various solvents, the ozonizing reaction may take place at various temperatures and varying amounts of water and oxygen may be employed both in ozonizing and in oxidation. The illustrative embodiments of the present invention which will be detailed hereinafter are therefore not to be construed as defining or limiting the invention and reference should be had to the appended claims to determine the scope thereof.

Phenanthrene is a component of high temperature coal tars, is available in considerable quantity, and at very low price. Diphenic acid produced from phenanthrene at low cost in accordance with the present invention will have great commercial possibilities for use in resins, in alkyd films and for many other commercial requirements. By known procedures one pound of diphenic acid costs approximately $12.00 for the raw materials alone while diphenic acid produced in accordance with the present invention would cost approximately $.20 per pound for the raw materials.

50% yields of diphenic acid have been obtained from simple batch ozonation and oxidation of phenanthrene with but one mole of ozone required per mole of phenanthrene.

In accordance with an illustrative procedure based upon the present invention approximately 0.05 mole of phenanthrene was dissolved in 100 ml. of hot glacial acetic acid. This solution was cooled slowly to room temperature and poured into a reactor with ozone passing therethrough. The phenanthrene was ozonized at room temperature in a water bath with approximately 1–6% ozonized oxygen until 0.05 mole of ozone had been used. 10% water by total weight of the solution was then added and the temperature was raised slowly to 100° C. and the mixture was refluxed and hydrolyzed for an hour. After hydrolysis of the ozonized compound in the reactor, the oxidation step was continued with oxygen and the ozone concentration reduced to approximately 0.1% by weight.

The solution was then cooled and anthraquinone was filtered off. The solvent was next removed under reduced pressure by heating the solution to 55°–70° C. until about 5 ml. of the acetic acid solvent remained. The 5 ml. of acid was then put into solution using approximately 100 ml. of benzene-cyclohexane mixture and this solution was heated to boiling and then cooled rapidly. The cool solution was extracted with 8% $NaHCO_3$ and was acidified with concentrated HCl. Diphenic acid was precipitated in granular form. A 20 mole percent yield of diphenic acid was obtained.

The benzene-cyclohexane solution from which the diphenic acid had precipitated was allowed to stand for a few days and an additional 2.43 grams of diphenic acid was extracted. This produced a total yield of 4.87 g. or 40.2 mole percent.

The following table shows the results of similar procedures for the ozonation of phenanthrene to produce diphenic acid:

TABLE I

Ozonation of phenanthrene

| Experiment Number | Moles of Phenanthrene | Moles of Ozone Absorbed | Ozone Flow Rate, C. F. M. | Mole Percent Yield of Diphenic Acid | Weight Percent Yield of Other Products Obtained [1] | Remarks |
|---|---|---|---|---|---|---|
| I | 0.05 | 0.05 | .02 | 40.2 | | |
| II | 0.05 | 0.05 | .05 | 12.4 | 0.3 anthraquinone / 3.4 phenanthrene / 3.4 unknown, M. P. 61° C | Yellow-orange in color. |
| III | 0.01 | 0.01 | .03 | 18.6 | 5.0 anthraquinone | $CCl_4$ was used to extract the acetic acid. |
| IV | 0.05 | 0.05 | .02 | 50.7 | 4.6 anthraquinone | |
| V | 0.05 | 0.05 | .02 | not determined | 2.8 anthraquinone | Experiment halted after hydrolysis step. |
| VI | 0.05 | 0.05 | .02 | 26.2 | 1.57 anthraquinone / 50.6 unknown, M. P. 60° C | Stopped after hydrolysis. |
| VII | 0.05 | 0.05 | .02 | not determined | 7.0 unknown, M. P. 60° C | Do. |
| VIII | 0.051 | 0.08 | .02 | | 96.3 gummy material | Ozonated in chloroform. |
| IX | 0.05 | 0.08 | .02 | 31.3 | | |

[1] These figures are based on the weight of starting material and the material obtained.

It will be noted from the above tabular results of processes in accordance with the present invention that the greatest yield of diphenic acid was obtained in Example 4. In this example the material was oxidized for one and a half hours as compared with three hours in previous examples. The diphenic acid was extracted by pouring the remaining 5 ml. of acetic acid solution into 250 ml. of cold distilled water. Before purification the diphenic acid melted at 220° C. (melting point of pure diphenic acid is 228–229° C.) and the yield of unpurified diphenic acid was 50.7 mole percent. Examples 5–7 of the above described procedure was stopped at the end of the hydrolysis step to determine the amount of diphenic acid produced at this point.

In Example 8 the phenanthrene was dissolved in chloroform and then ozonized to eliminate troublesome extraction of the material from acetic acid. During the hydrolysis step of this example the material came down as a gummy mass.

In Example 9 the oxidation step was carried out until the aldehyde content appeared to be negligible. A benzene-heptane solvent mixture was used to extract the diphenic acid. This solvent mixture was divided into three equal parts and the parts were extracted with 5% $NaHCO_3$. Two of these solutions were then heated with sodium bicarbonate solutions for approximately one and a half hours. The sodium bicarbonate solution was separated from the benzene-heptane mixture and concentrated HCl was added. Each part yielded approximately one gram of acid. An additional 0.5 g. of diphenic acid was obtained upon acidification of the benzene-heptane solutions after they had been combined, boiled and stirred vigorously with 10% NaOH solution.

It will now be apparent from the above that by the present invention novel processes have been provided for the production of diphenic acid by the direct ozonation of phenanthrene which in every way satisfies the object described above.

Changes in or modifications to the illustrative procedures described above may now be suggested to those skilled in the art without departing from the present inventive concept and reference should therefore be had to the appended claims to determine the scope of this invention.

What is claimed is:

1. In a process for producing an intermediate ozonized compound oxidizable to diphenic acid from phenanthrene, the step of reacting at approximately 25–30° C. equi-molecular quantities of phenanthrene directly with gaseous ozone in oxygen and hydrolyzing the ozonized compounds by refluxing with about 10% water at approximately 100° C. for approximately one hour.

2. A process for producing diphenic acid from phenanthrene, the steps of dissolving about 9 parts phenanthrene in about 100 parts of a solvent, reacting gaseous ozone in oxygen at temperatures of approximately 25–30° C. with the resulting solution to form ozonized compounds, hydrolyzing the ozonized compounds by refluxing with about 10% water at approximately 100° C. for approximately one hour, oxidizing the hydrolyzed ozonized compounds with gaseous oxygen containing ozone, and precipitating diphenic acid therefrom.

3. A process for producing diphenic acid from phenanthrene, the steps of dissolving about 9 parts phenanthrene in about 100 parts hot glacial acetic acid, ozonizing the resulting solution at room temperature in a water bath with one mole of gaseous ozone in oxygen per mole of phenanthrene to obtain ozonized compounds in solution, adding about 10% water to the solution, refluxing the solution at increased temperatures of about 100° C. for one hour, oxidizing the solution with gaseous oxygen containing ozone, and then precipitating the diphenic acid from the solution.

4. A process for producing diphenic acid from phenanthrene, the steps of dissolving about 9 parts of phenanthrene in about 100 parts acetic acid, ozonizing the resulting solution at room temperatures in a water bath with a mixed oxygen-ozone gas containing approximately 1–6% ozone until equal mole parts of ozone to phenanthrene have been added to form ozonized compounds in solution, refluxing the solution with about 10% water at increased temperatures at about 100° C. for approximately one hour, and oxidizing the resultant hydrolyzed ozonized compounds for approximately three hours with gaseous oxygen containing approximately 0.1% ozone by weight, removing the acetic acid, and then precipitating the diphenic acid.

5. In a process for producing diphenic acid from phenanthrene, the steps of dissolving about 9 parts phenanthrene into about 100 parts solution, reacting the solution with a mixed oxygen-ozone gas containing 1–6% azone at 25–30° C. to produce ozonized compounds, refluxing the ozonized compounds with about 10% water at increased temperatures at about 100° C. oxidizing the hydrolyzed ozonized compounds with gaseous oxygen for approximately three hours, and then precipitating diphenic acid from the oxidized solution.

References Cited in the file of this patent

UNITED STATES PATENTS

| | | |
|---|---|---|
| 1,423,980 | Williams | July 25, 1922 |
| 2,673,217 | Hull | Mar. 23, 1954 |

OTHER REFERENCES

Ochiai: Chem. Abstracts, vol. 21, 3055 (1927).
Long: Chem. Rev. 27, pp. 460–461 (1940).
Paillard et al.: Helv. Chim. Acta 25, pp. 1528–1533 (1942).
Criegee: Ann., pp. 564–9 (1949).
Fieser et al.: Organic Chemistry, p. 830 (1950).
O'Conner et al.: Ind. and Engineering Chem., vol. 45, pp. 277–8 (1953).
Wilbaut: Akademie Van Wetenschappen—Amsterdam Proceedings, Series B 59, No. 5 (1956).

UNITED STATES PATENT OFFICE

CERTIFICATE OF CORRECTION

Patent No. 2,872,480                                            February 3, 1959

Ruth M. Pentz

It is hereby certified that error appears in the printed specification of the above numbered patent requiring correction and that the said Letters Patent should read as corrected below.

Column 4, line 32, for "azone" read -- ozone --; line 35, for "campounds" read -- compounds --; line 53, list of references cited, under "OTHER REFERENCES", for "277-8" read -- 277-81 --.

Signed and sealed this 26th day of May 1959.

(SEAL)
Attest:

KARL H. AXLINE                                                              ROBERT C. WATSON
Attesting Officer                                                      Commissioner of Patents